United States Patent
Howard

(10) Patent No.: US 11,005,401 B1
(45) Date of Patent: May 11, 2021

(54) METHODS FOR OPERATING AN INVERTER-BASED RESOURCE CONNECTED TO A SERIES-COMPENSATED TRANSMISSION SYSTEM

(71) Applicant: General Electric Company, Schenectady, NY (US)

(72) Inventor: Dustin Howard, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/905,963

(22) Filed: Jun. 19, 2020

(51) Int. Cl.
| | | |
|---|---|---|
| *H02P 9/10* | (2006.01) | |
| *F03D 9/25* | (2016.01) | |
| *H02P 9/00* | (2006.01) | |
| *H02J 3/38* | (2006.01) | |
| *H02M 5/458* | (2006.01) | |
| *H02P 101/15* | (2016.01) | |

(52) U.S. Cl.
CPC .................. *H02P 9/10* (2013.01); *F03D 9/25* (2016.05); *H02P 9/007* (2013.01); *H02J 3/381* (2013.01); *H02J 2300/22* (2020.01); *H02J 2300/28* (2020.01); *H02M 5/4585* (2013.01); *H02P 2101/15* (2015.01)

(58) Field of Classification Search
CPC ........ H02P 9/10; H02P 9/007; H02P 2101/15; F03D 9/25; H02J 2300/28; H02J 2300/22; H02J 3/381; H02M 5/4585
See application file for complete search history.

(56) References Cited

U.S. PATENT DOCUMENTS

| | | | |
|---|---|---|---|
| 5,519,305 A | 5/1996 | Nomura | |
| 6,847,185 B2 | 1/2005 | Kume et al. | |
| 7,692,321 B2 | 4/2010 | Jones et al. | |
| 7,808,126 B2* | 10/2010 | Stiesdal | H02J 3/1878 307/84 |
| 7,952,214 B2 | 5/2011 | Ichinose et al. | |
| 8,664,788 B1 | 3/2014 | Wagoner et al. | |
| 9,041,234 B2 | 5/2015 | Lu et al. | |
| 2007/0024059 A1* | 2/2007 | D'Atre | H02P 9/007 290/44 |
| 2009/0251081 A1 | 10/2009 | Thunes et al. | |
| 2009/0322083 A1 | 12/2009 | Wagoner et al. | |
| 2010/0142237 A1 | 1/2010 | Yuan et al. | |
| 2010/0207463 A1* | 8/2010 | Fortmann | F03D 9/255 307/153 |

(Continued)

*Primary Examiner* — Tulsidas C Patel
*Assistant Examiner* — Joseph Ortega
(74) *Attorney, Agent, or Firm* — Dority & Manning, P.A.

(57) ABSTRACT

A method for operating an inverter-based resource includes monitoring a current magnitude in the inverter-based resource. The method also includes monitoring a voltage magnitude in the inverter-based resource. Further, the method includes comparing the current magnitude in the inverter-based resource to a primary current threshold. Moreover, the method includes comparing the voltage magnitude in the inverter-based resource to a voltage threshold. As such, the method also includes disabling switching of the switching elements of the power converter when the current magnitude increases above the primary current threshold and the voltage magnitude decreases below the voltage threshold to bypass the switching elements of the power converter until excess energy in the inverter-based resource is dissipated.

19 Claims, 7 Drawing Sheets

(56) References Cited

U.S. PATENT DOCUMENTS

| | | |
|---|---|---|
| 2011/0140430 A1 | 6/2011 | Ritter et al. |
| 2013/0279228 A1 | 10/2013 | Zhu et al. |
| 2014/0361538 A1 | 12/2014 | Wagoner et al. |
| 2015/0249414 A1 | 9/2015 | Barker |
| 2015/0295398 A1 | 10/2015 | Wagoner et al. |
| 2017/0250540 A1* | 8/2017 | Varma .................... H02J 3/386 |
| 2018/0342968 A1* | 11/2018 | Holliday ................. H02P 9/006 |

* cited by examiner

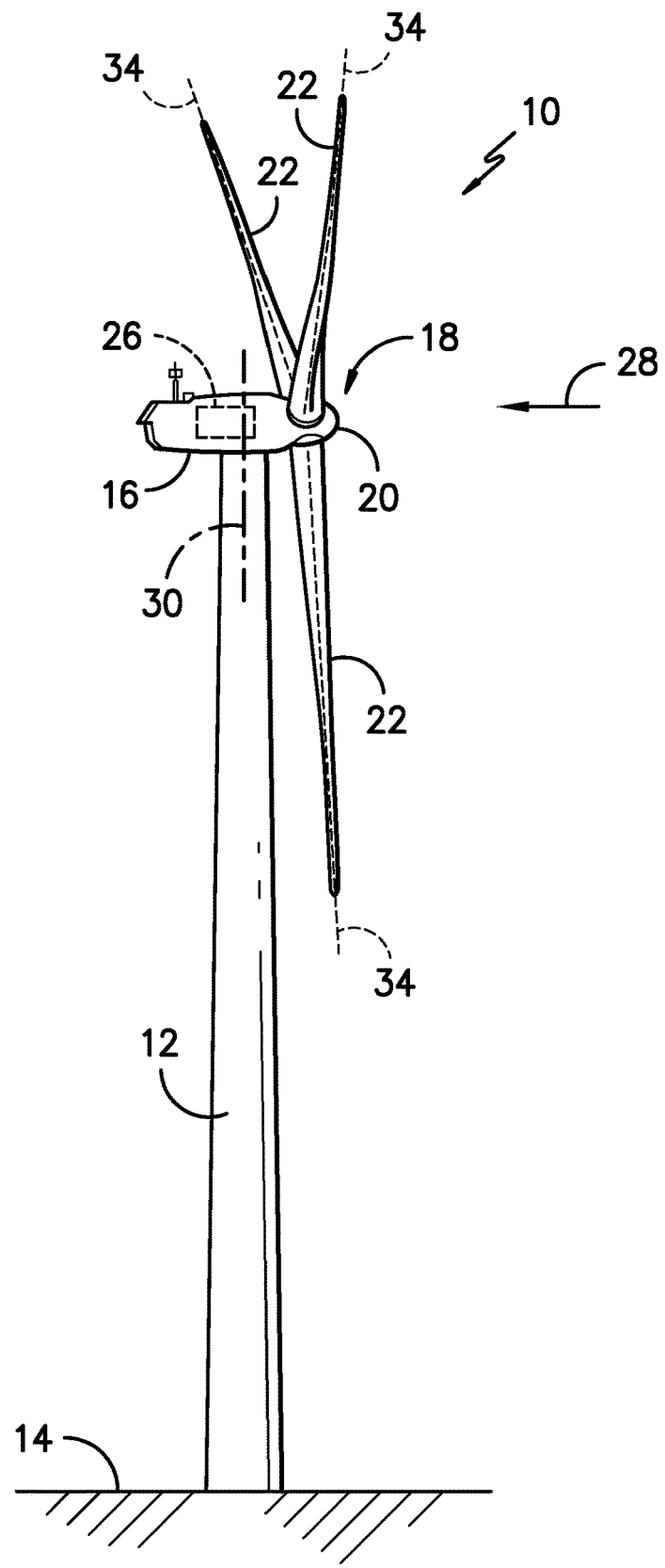
FIG. -1-

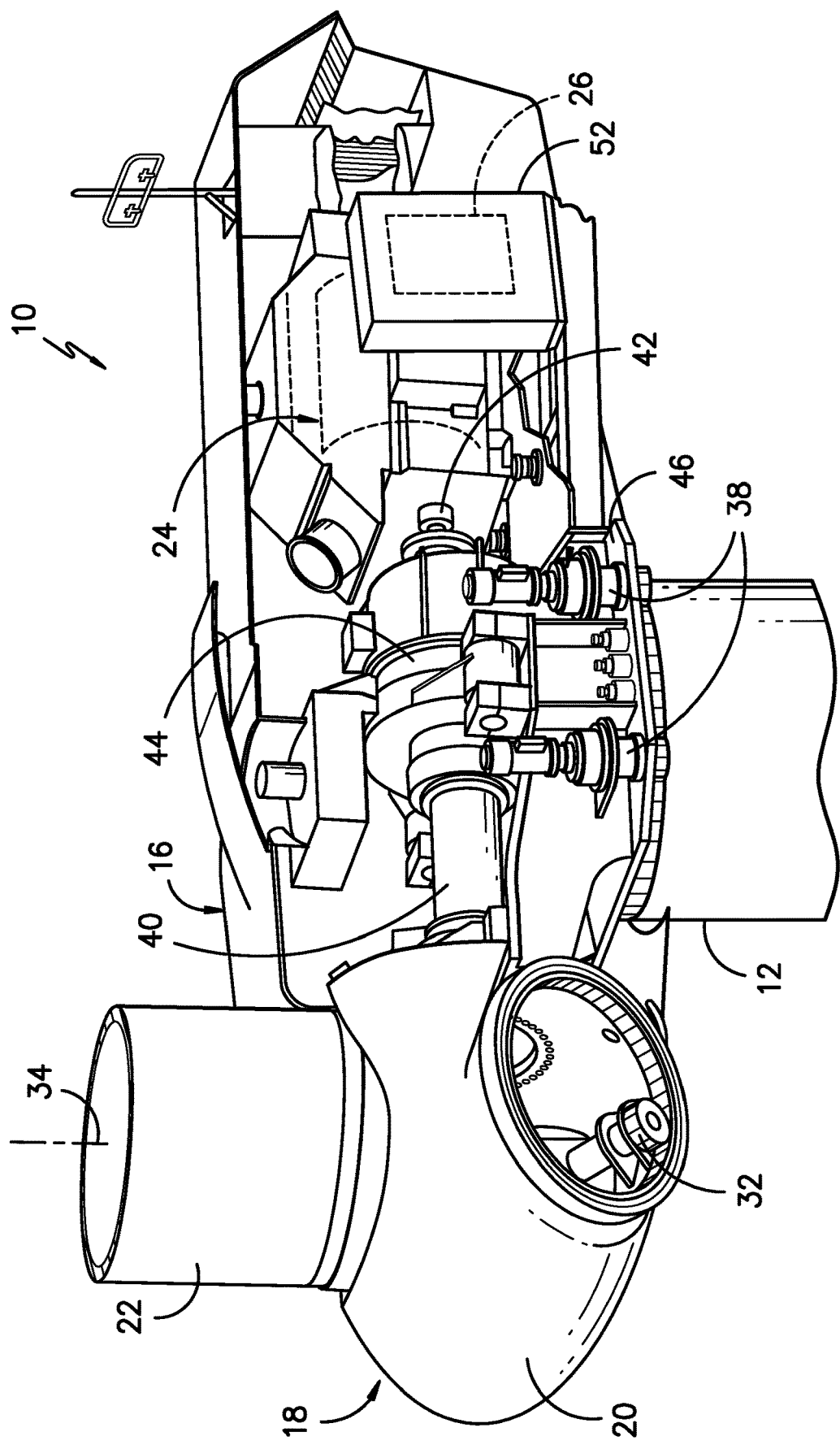
FIG. -2-

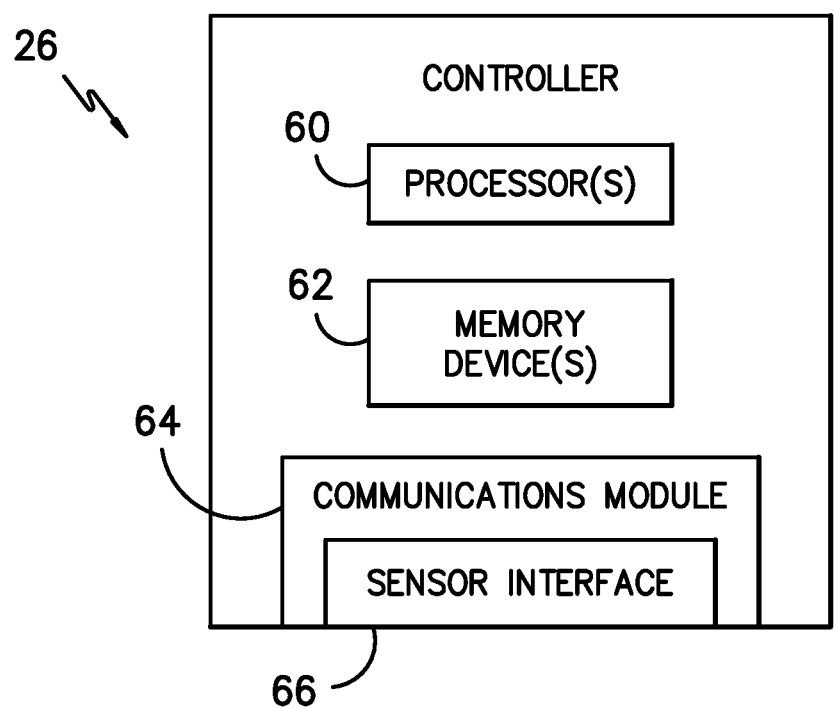
FIG. -3-

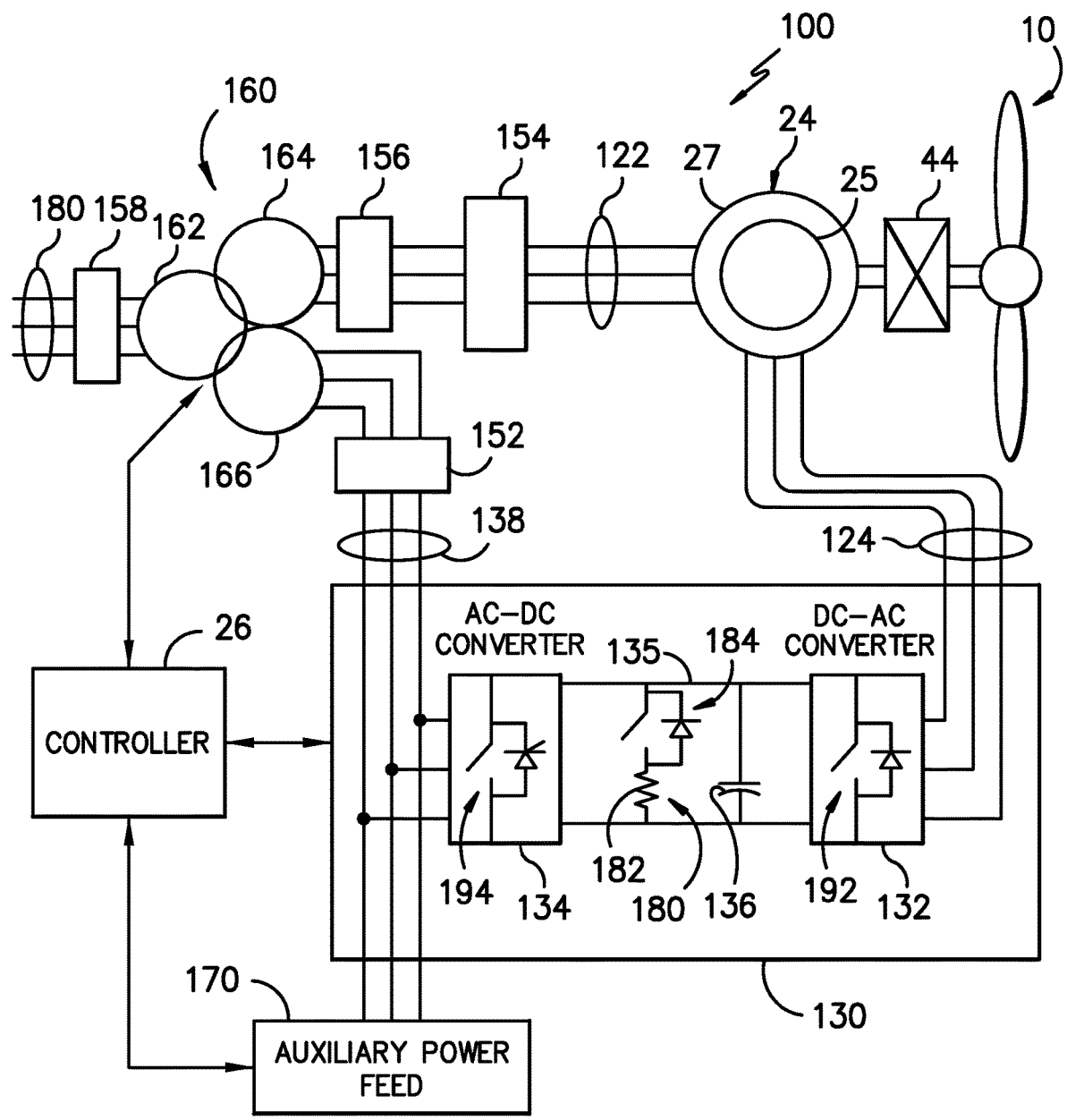
FIG. -4-

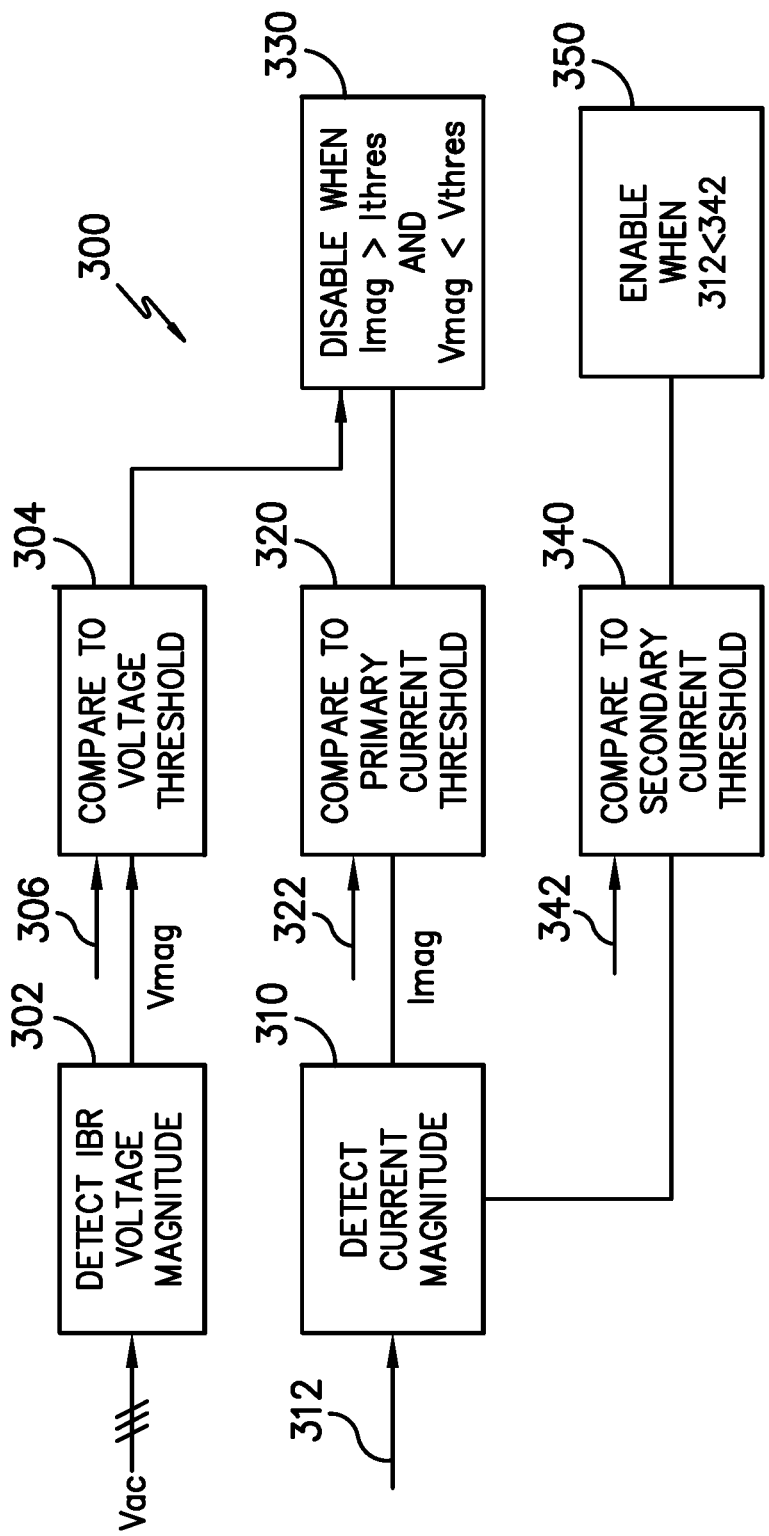
FIG. -5-

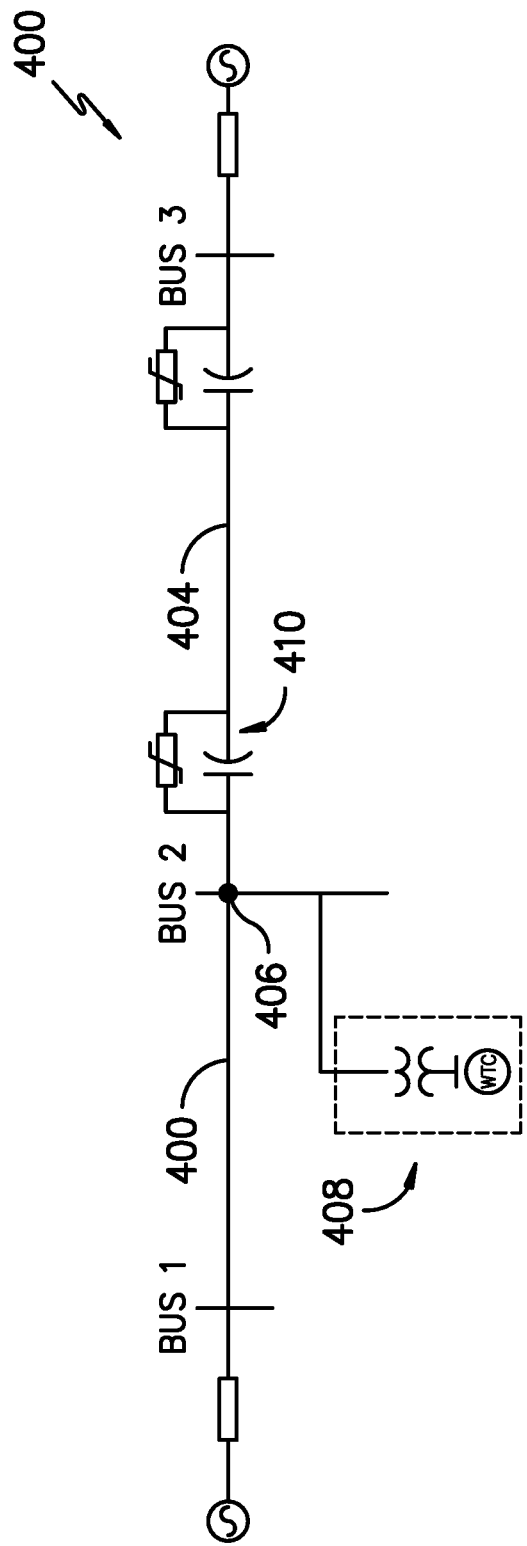
FIG. -6-

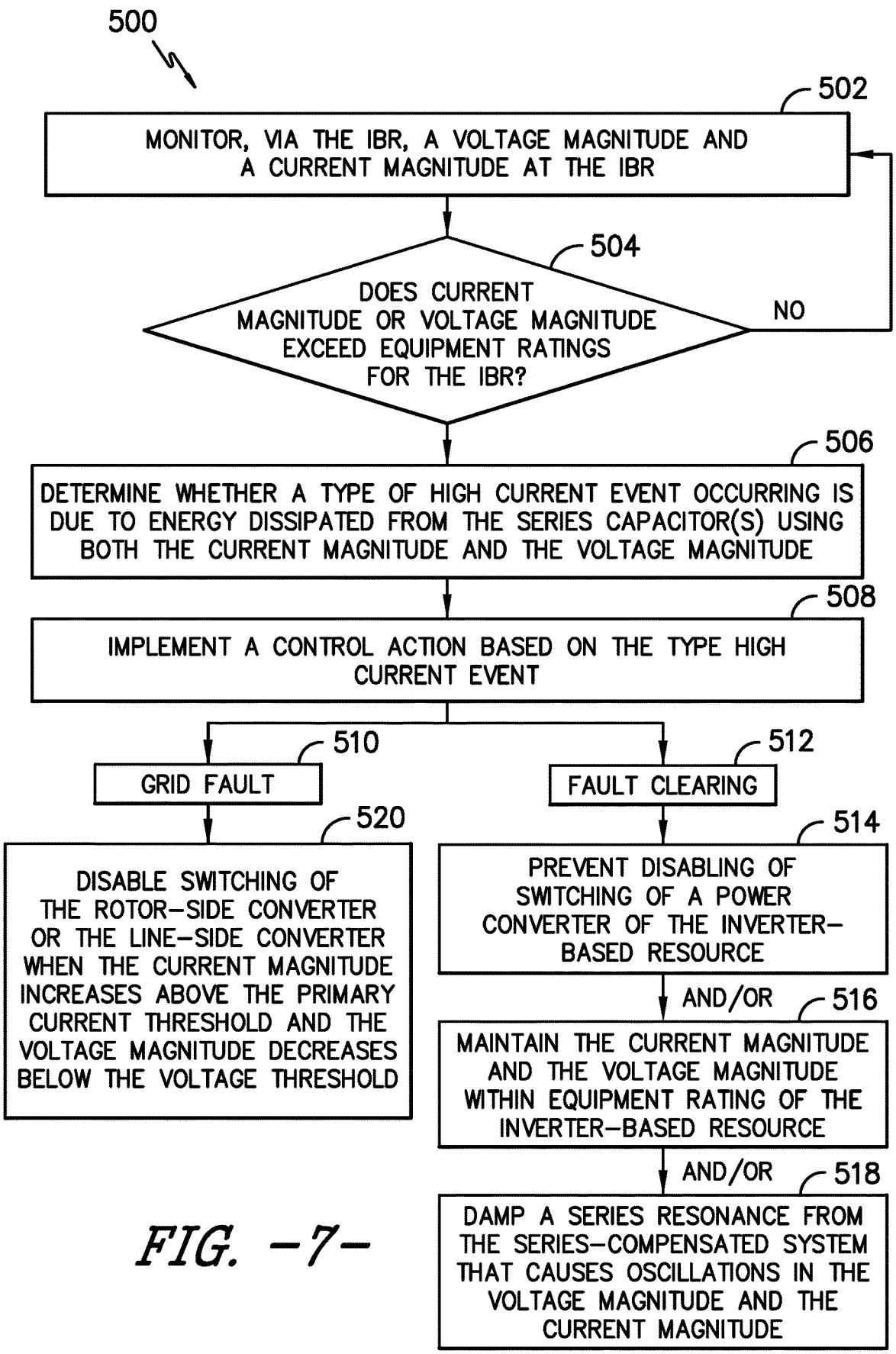
FIG. -7-

METHODS FOR OPERATING AN INVERTER-BASED RESOURCE CONNECTED TO A SERIES-COMPENSATED TRANSMISSION SYSTEM

FIELD

The present disclosure relates generally to inverter-based resources, and more particularly to methods for operating inverter-based resources, such as electrical power systems, connected to a series-compensated transmission system.

BACKGROUND

Wind turbines have received increased attention as a renewable energy source. Wind turbines use the wind to generate electricity. The wind turns multiple blades connected to a rotor. The spin of the blades caused by the wind spins a shaft of the rotor, which connects to a generator that generates electricity. Certain wind turbines include a dual-fed asynchronous generator (DFAG) (also commonly referred to as a doubly-fed induction generator (DFIG)) to convert wind energy into electrical power suitable for output to an electrical grid. DFAGs are typically connected to a converter that regulates the flow of electrical power between the DFAG and the grid. More particularly, the converter allows the wind turbine to output electrical power at the grid frequency regardless of the rotational speed of the wind turbine blades.

A typical DFAG system includes a wind driven DFAG having a rotor and a stator. The stator of the DFAG is coupled to the electrical grid through a stator bus. A power converter is used to couple the rotor of the DFAG to the electrical grid. The power converter can be a two-stage power converter including both a rotor-side converter and a line-side converter. The rotor-side converter can receive alternating current (AC) power from the rotor via a rotor bus and can convert the AC power to a DC power. The line-side converter can then convert the DC power to AC power having a suitable output frequency, such as the grid frequency. The AC power is provided to the electrical grid via a line bus. An auxiliary power feed can be coupled to the line bus to provide power for components used in the wind turbine system, such as fans, pumps, motors, and other components of the wind turbine system.

Inverter-based resources (IBRs), such as wind turbines, solar inverters, or energy storage systems, that include power converters, are generally sensitive to current flow beyond their design rating. Excessive currents can flow in these power converters if sudden imbalances in the energy input/output of their surrounding electric system occur and stored energy in the system has a path for dissipating through the converter. Such sudden energy imbalances may be due to inception of various faults and/or clearing of such faults. This can result in excessive energy in the power converter, which can cause damage to the converter. For example, in a DFAG, a grid fault that causes a sudden drop in voltage results in a sudden drop in the power/energy that can be exported from the system. This event results in an increase in the voltages induced on the rotor circuit of the DFAG due to the stored energy within the magnetic components of the generator, which can lead to high currents flowing in the converter.

Another example that may result in high currents flowing in a power converter involves a series-compensated transmission system. During grid faults, the high short-circuit currents flowing from the grid through the series capacitor bank results in a large energy buildup in the series capacitor. Upon clearing of this fault, the energy stored within the series capacitor dissipates through the interconnected transmission system, which may include nearby IBRs. This sudden discharge of energy from the series capacitor bank may manifest as high currents and/or voltages in nearby IBRs. For this event, the IBR should avoid tripping, take control actions to try and maintain the voltage/current within the equipment capability, and damp the resonance resulting from the series-compensated system.

Accordingly, a previous method of managing high currents in the power converter of an IBR is provided in U.S. application Ser. No. 15/604,921 filed on May 25, 2017 entitled "Methods for Operating Electrical Power Systems." The disclosed method involves detecting the high currents in a converter, comparing to a threshold, and deciding to turn off gating of the converter if the detected currents exceed a threshold. This method works well when the amount of energy in the system dissipates quickly and gating can be resumed quickly upon dissipation of the stored energy (for example, through a dynamic brake circuit).

In some cases, however, where a resonance is present in the system (such as a resonance due to a series capacitor bank) or the source of energy causing the high currents is large relative to the converter dissipation capability, it may be beneficial to continue gating despite high currents in the converter. This benefit is due to the converter ability to mitigate the high voltages and/or currents through control action, which would otherwise not be possible if gating is disabled.

Accordingly, the present disclosure is directed to systems and methods for distinguishing between events causing high currents that can successfully be managed by disabling gating versus events that are best managed by continuing gating to attempt mitigation of high current levels via control action.

BRIEF DESCRIPTION

Aspects and advantages of the invention will be set forth in part in the following description, or may be obvious from the description, or may be learned through practice of the invention.

In an aspect, the present disclosure is directed to a method for operating an inverter-based resource. The method includes monitoring a current magnitude in the inverter-based resource. The method also includes monitoring a voltage magnitude in the inverter-based resource. Further, the method includes comparing the current magnitude in the inverter-based resource to a primary current threshold. Moreover, the method includes comparing the voltage magnitude in the inverter-based resource to a voltage threshold. As such, the method also includes disabling switching of the switching elements of the power converter when the current magnitude increases above the primary current threshold and the voltage magnitude decreases below the voltage threshold to bypass the switching elements of the power converter until excess energy in the inverter-based resource is dissipated.

In an embodiment, the method may also include disabling switching of the switching elements of the power converter when the current magnitude increases above the primary current threshold simultaneously with the voltage magnitude decreasing below the voltage threshold.

In another embodiment, the inverter-based resource may be a dual-fed asynchronous generator (DFAG). In such embodiments, the DFAG may have a generator rotor and a generator stator. In such embodiments, the method may include detecting the voltage magnitude in the generator stator.

In further embodiments, the voltage threshold may be set to a voltage level that is observed for close-in grid faults. For example, in such embodiments, the voltage threshold may range from about 0.1 pu to about 0.5 pu.

In further embodiments, by requiring both the current magnitude to increase above the primary current threshold and the voltage magnitude to decrease below the voltage threshold before disabling switching, the method distinguishes between high currents caused by a discharge of energy stored within the inverter-based resource and high currents caused by energy discharge from sources external to the inverter-based resource.

In particular embodiments, the method may also include comparing, after disabling occurs, the current magnitude in the power converter to a secondary current threshold and enabling switching of the switching elements in the power converter when the current magnitude is less than the secondary current threshold. In such embodiments, the secondary current threshold is different from the primary current threshold.

In certain embodiments, the power converter may include a DC link and a dynamic brake. Thus, in certain embodiments, the dynamic brake may be gated on after disabling occurs.

In another embodiment, the inverter-based resource may be a full conversion wind turbine power system, a solar power system, an energy storage system, or combinations thereof.

In another aspect, the present disclosure is directed to a method for operating an inverter-based resource connected to a series-compensated transmission system. The series-compensated transmission system has at least one series capacitor. The method includes monitoring, via the inverter-based resource, a voltage magnitude and a current magnitude at the inverter-based resource. When at least one of the current magnitude or the voltage magnitude exceed equipment ratings, the method includes determining whether a type of high current event occurring is due to energy dissipated from the at least one series capacitor using both the current magnitude and the voltage magnitude. Further, the method includes implementing a control action based on the type of high current event.

In an embodiment, the type of high current event may include, for example, a grid fault or a fault clearing in the series-compensated transmission system.

In one embodiment, the dissipated energy may be received from the series capacitor. In such embodiments, when the dissipated energy is received from the series capacitor, implementing the control action based on the type of high current event occurring in the inverter-based resource may include preventing, via the inverter-based resource, disabling of bridge switching of a power converter of the inverter-based resource.

In another embodiment, when the dissipated energy is received from the series capacitor, implementing the control action based on the type of high current event occurring in the inverter-based resource may include maintaining, via the inverter-based resource, the current magnitude and the voltage magnitude within equipment ratings of the inverter-based resource.

In additional embodiments, when the dissipated energy is received from the series capacitor, implementing the control action based on the type of high current event occurring in the inverter-based resource may also include damping a series resonance from the series-compensated system that causes oscillations in the voltage magnitude and the current magnitude.

In alternative embodiments, the dissipated energy may be received from the power grid. In such embodiments, when the dissipated energy is received from the power grid, implementing the control action based on the type of high current event occurring in the inverter-based resource may include disabling bridge switching of the power converter when the current magnitude increases above the primary current threshold and the voltage magnitude decreases below the voltage threshold.

In yet another aspect, the present disclosure is directed to a wind power system connected to a series-compensated transmission system. The series-compensated transmission system has at least one series capacitor. The wind power system includes a dual-fed asynchronous generator having a generator rotor and a generator stator, a power converter coupled to the generator rotor, and a controller communicatively coupled to the power converter. The power converter has a rotor-side converter and a line-side converter. The rotor-side converter or the line-side converter includes a plurality of switching elements defining a bridge. The controller is configured to perform a plurality of operations, including but not limited to, receiving voltage and current feedbacks from the wind turbine power system, determining a voltage magnitude and a current magnitude at the wind power system based on the voltage and current feedbacks, when at least one of the current magnitude or the voltage magnitude exceed equipment ratings, determining a type of high current event occurring using both the current magnitude and the voltage magnitude, and selecting between disabling or enabling bridge switching of the rotor-side converter or the line-side converter based on the type of high current event.

In an embodiment, the type of high current event may include a grid fault in the power grid or a fault clearing in the wind power system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a wind turbine according to one embodiment of the present disclosure;

FIG. 2 illustrates a perspective, internal view of a nacelle of a wind turbine according to one embodiment of the present disclosure;

FIG. 3 illustrates a schematic diagram of one embodiment of suitable components that may be included within a controller of a wind turbine and/or electrical power system;

FIG. 4 illustrates an electrical power system according to one embodiment of the present disclosure;

FIG. 5 illustrates a flow chart of one embodiment of a method according to one embodiment of the present disclosure;

FIG. 6 illustrates a simplified, schematic diagram of one embodiment of a series compensated transmission system according to one embodiment of the present disclosure; and FIG. 7 illustrates a flow chart of another embodiment of a method according to one embodiment of the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for deciding to disable converter gating by considering both current magnitude and voltage magnitude. As such, the present disclosure requires both conditions (e.g. high current and low voltage) to be met to disable gating. These conditions generally occur in a DFAG immediately after the inception of a fault, in which the voltage at the DFAG suddenly drops and the currents in the rotor suddenly increase. Therefore, for these conditions, it is beneficial to disable gating to allow rapid dissipation of excess energy stored in the electrical system of the DFAG. Afterwards, gating can be resumed upon the reduction of currents to an acceptable level.

At fault clearing, however, the voltage at an IBR increases from a low-level to a higher level. In series-compensated transmission systems, the series resonance results in oscillations in voltage and current in the network upon fault clearing. These voltage and current oscillations in the system can be large in amplitude and overwhelm the IBR if the power rating of series capacitor banks is large relative to the power rating of the IBR. These large oscillations can push currents and voltages beyond the ratings of the IBR equipment. Therefore, it is less desirable to disable gating during these events because the loss of control resulting in disabling gating prevents the converter from being able to damp the sub-synchronous resonance and mitigate the over and under voltages occurring due to the oscillations.

During these events, the voltage level at the IBR tends to be higher than voltage levels seen during grid faults. Therefore, the high currents that may flow in a power converter during this event can be distinguished from high currents caused by a grid fault, such as a low-voltage ride through (LVRT) event, by also considering voltage level. Accordingly, systems and methods of the present disclosure are less likely to result in disabling gating for this type of event if the voltage threshold is set relatively low. As such, the systems and methods of the present disclosure provide a benefit of allowing the power converter to continue attempting to manage the large voltage oscillations and continue damping the sub-synchronous oscillations via appropriate control actions.

As used herein, inverter-based resources generally refer to electrical devices that can generate or absorb electric power through switching of power-electronic devices. Accordingly, inverter-based resource may include wind turbine generators, solar inverters, energy-storage systems, STATCOMs, or hydro-power systems.

Referring now to the drawings, FIG. 1 illustrates a perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

As shown, the wind turbine 10 may also include a turbine control system or a turbine controller 26 centralized within the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10. For example, the controller 26 may be configured to control the blade pitch or pitch angle of each of the rotor blades 22 (i.e., an angle that determines a perspective of the rotor blades 22 with respect to the direction 28 of the wind) to control the loading on the rotor blades 22 by adjusting an angular position of at least one rotor blade 22 relative to the wind. For instance, the turbine controller 26 may control the pitch angle of the rotor blades 22, either individually or simultaneously, by transmitting suitable control signals/commands to various pitch drives or pitch adjustment mechanisms 32 (FIG. 2) of the wind turbine 10. Specifically, the rotor blades 22 may be rotatably mounted to the hub 20 by one or more pitch bearing(s) (not illustrated) such that the pitch angle may be adjusted by rotating the rotor blades 22 about their pitch axes 34 using the pitch adjustment mechanisms 32. Further, as the direction 28 of the wind changes, the turbine controller 26 may be configured to control a yaw direction of the nacelle 16 about a yaw axis 30 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 2) of the wind turbine 10 such that the nacelle 16 may be rotated about the yaw axis 30.

Still further, the turbine controller 26 may be configured to control the torque of the generator 24. For example, the turbine controller 26 may be configured to transmit control signals/commands to the generator 24 in order to modulate the magnetic flux produced within the generator 24, thus adjusting the torque demand on the generator 24. Such temporary de-rating of the generator 24 may reduce the rotational speed of the rotor blades 22, thereby reducing the aerodynamic loads acting on the blades 22 and the reaction loads on various other wind turbine 10 components.

It should be appreciated that the turbine controller 26 may generally comprise a computer or any other suitable processing unit. Thus, in several embodiments, the turbine controller 26 may include one or more processor(s) and associated memory device(s) configured to perform a variety of computer-implemented functions, as shown in FIG. 3 and discussed herein. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the turbine controller 26 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 26 to perform various computer-implemented functions including, but not limited to, performing proportional integral derivative ("PID") control algorithms, including various calculations within one or more PID control loops, and various other suitable computer-implemented functions. In addition, the turbine controller 26 may also include various input/output channels for receiving inputs from sensors and/or other measurement devices and for sending control signals to various components of the wind turbine 10.

It should additionally be understood that the controller may be a singular controller or include various components, such as pitch controllers and/or yaw controllers, which communicate with a central controller for specifically controlling pitch and yaw as discussed. Additionally, the term "controller" may also encompass a combination of computers, processing units and/or related components in communication with one another.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main rotor shaft 40 coupled to the hub 20 for rotation therewith. The generator 24 may then be coupled to the rotor shaft 40 such that rotation of the rotor shaft 40 drives the generator 24. For instance, in the illustrated embodiment, the generator 24 includes a generator shaft 42 rotatably coupled to the rotor shaft 40 through a gearbox 44. However, in other embodiments, it should be appreciated that the generator shaft 42 may be rotatably coupled directly to the rotor shaft 40. Alternatively, the generator 24 may be directly rotatably coupled to the rotor shaft 40 (often referred to as a "direct-drive wind turbine").

It should be appreciated that the rotor shaft 40 may generally be supported within the nacelle by a support frame or bedplate 46 positioned atop the wind turbine tower 12. For example, the rotor shaft 40 may be supported by the bedplate 46 via a pair of pillow blocks 48, 50 mounted to the bedplate 46.

Additionally, as indicated herein, the turbine controller 26 may also be located within the nacelle 16 of the wind turbine 10. For example, as shown in the illustrated embodiment, the turbine controller 26 is disposed within a control cabinet 52 mounted to a portion of the nacelle 16. However, in other embodiments, the turbine controller 26 may be disposed at any other suitable location on and/or within the wind turbine 10 or at any suitable location remote to the wind turbine 10. Moreover, as described herein, the turbine controller 26 may also be communicatively coupled to various components of the wind turbine 10 for generally controlling the wind turbine and/or such components. For example, the turbine controller 26 may be communicatively coupled to the yaw drive mechanism(s) 38 of the wind turbine 10 for controlling and/or altering the yaw direction of the nacelle 16 relative to the direction 28 (FIG. 1) of the wind. Similarly, the turbine controller 26 may also be communicatively coupled to each pitch adjustment mechanism 32 of the wind turbine 10 (one of which is shown) for controlling and/or altering the pitch angle of the rotor blades 22 relative to the direction 28 of the wind. For instance, the turbine controller 26 may be configured to transmit a control signal/command to each pitch adjustment mechanism 32 such that one or more actuators (not shown) of the pitch adjustment mechanism 32 may be utilized to rotate the blades 22 relative to the hub 20.

In particular, the controller 26 may be utilized to perform such methods, and may further control torque adjustment of the generator 24, yaw adjustment of the wind turbine 10, and/or pitch adjustment of the rotor blades 22 based on such methods as discussed herein. Referring now to FIG. 3, there is illustrated a block diagram of one embodiment of suitable components that may be included within the turbine controller 26 in accordance with aspects of the present subject matter. As shown, the controller 26 may include one or more processor(s) 60 and associated memory device(s) 62 configured to perform a variety of computer-implemented functions (e.g., performing the methods, steps, calculations and the like disclosed herein). Additionally, the controller 26 may also include a communications module 64 to facilitate communications between the controller 26 and the various components of the wind turbine 10. For instance, the communications module 64 may serve as an interface to permit the turbine controller 26 to transmit control signals to each pitch adjustment mechanism 32 for controlling the pitch angle of the rotor blades 22. Moreover, the communications module 64 may include a sensor interface 66 (e.g., one or more analog-to-digital converters) to permit input signals transmitted from, for example, various sensor, to be converted into signals that can be understood and processed by the processors 60.

Referring now to FIG. 4, an exemplary electrical power system 100, which in this embodiment is a dual-fed asynchronous generator (DFAG) wind turbine system, is illustrated according to an exemplary embodiment of the present disclosure. In the exemplary system 100, wind turbine 10 includes, as discussed above, an optional gear box 44, which is, in turn, coupled to the generator 24. In accordance with aspects of the present disclosure, the generator 24 is a dual-fed asynchronous generator (DFAG) 24 having a generator stator 25 and a generator rotor 27. It should be understood, however, that the present disclosure is not limited to DFAG systems 100 and DFAGs 24, and rather that any suitable system and generator, including for example full power conversion systems and generators, is within the scope and spirit of the present disclosure.

The DFAG 24 is typically coupled to a stator bus 122 and a power converter 130 via a rotor bus 124. The stator bus 122 provides an output multiphase power (e.g. three-phase power) from a stator of DFAG 24 and the rotor bus 124 provides an output multiphase power (e.g. three-phase power) of the rotor of DFAG 24. Referring to the power converter 130, DFAG 24 is coupled via the rotor bus 124 to a rotor-side converter 132. The rotor-side converter 132 is coupled to a line-side converter 134 which in turn is coupled to a line side bus 138.

The power converter 130 may include one or more rotor-side switching elements 192, which may be components of the rotor-side converter 132, and one or more line-side switching elements 194, which may be components of the line-side converter 134. The switching elements 192 for the various phases of the rotor-side converter 132 may be included in the bridge of the rotor-side converter 132, and the switching elements 194 for the various phases of the line-side converter 134 may be included in the bridge of the line-side converter 134. In certain embodiments, for example, the switching elements 192, 194 may be IGBTs. For example, in exemplary configurations, the rotor-side converter 132 and the line-side converter 134 are configured for normal operating mode in a three-phase, pulse width modulation (PWM) arrangement using insulated gate bipolar transistors (IGBTs) as switching devices. Other suitable switching devices can be used, such as insulated gate commuted thyristors, MOSFETs, bipolar transistors, silicon controlled rectifiers, or other suitable switching devices. The rotor-side converter 132 and the line-side converter 134 can be coupled via a DC link 135 across which is the DC link capacitor 136.

The power converter 130 can be communicatively coupled to controller 26 to control the operation of the rotor-side converter 132 and the line-side converter 134. For instance, the controller 26 can send control commands to the rotor-side converter 132 and line-side converter 134 to control the modulation of switching elements (such as IGBTs) used in the power converter 130 to provide a desired real and reactive power output.

As illustrated, the system 100 includes a transformer 160 coupling the wind turbine system 100 to an electrical grid 180. The transformer 160 of FIG. 4 is a three-winding transformer that includes a high voltage (e.g. greater than 12 KVAC) primary winding 162 coupled to the electrical grid, a medium voltage (e.g. 6 KVAC) secondary winding 164 coupled to the stator bus 122, and a low voltage (e.g. 575 VAC, 690 VAC, etc.) auxiliary winding 166 coupled to the line bus 138. It should be understood that the transformer 160 can be a three-winding transformer as shown, or alternatively may be a two-winding transformer having only a primary winding 162 and a secondary winding 164; may be a four-winding transformer having a primary winding 162, a secondary winding 164, an auxiliary winding 166, and an additional auxiliary winding; or may have any other suitable number of windings.

An auxiliary power feed 170 is coupled to the output of the power converter 130. The auxiliary power feed 170 acts as a power source for various components of the wind turbine system 100. For instance, the auxiliary power feed 170 can power fans, pumps, motors, and other suitable components of the wind turbine system 100.

In operation, power generated at the DFAG 24 by rotating the rotor 106 is provided via a dual path to electrical grid 180. The dual paths are defined by the stator bus 122 and the rotor bus 124. On the rotor bus 124 side, sinusoidal multi-phase (e.g. three-phase) alternating current (AC) power is provided to the power converter 130. The rotor side power converter 132 converts the AC power provided from the rotor bus 124 into direct current (DC) power and provides the DC power to the DC link 135. Switching devices (e.g. IGBTs) used in parallel bridge circuits of the rotor side power converter 132 can be modulated to convert the AC power provided from the rotor bus 124 into DC power suitable for the DC link 135.

The line-side converter 134 converts the DC power on the DC link 135 into AC power at a frequency suitable for the electrical grid 180. In particular, switching devices (e.g. IGBTs) used in bridge circuits of the line side power converter 134 can be modulated to convert the DC power on the DC link 135 into AC power on the line side bus 138. The power from the power converter 130 can be provided via the auxiliary winding 166 of the transformer 160 to the electrical grid 180.

The power converter 130 can receive control signals from, for instance, the controller 26. The control signals can be based, among other things, on sensed conditions or operating characteristics of the wind turbine system 100. For instance, the control signals can be based on sensed voltage associated with the transformer 160 as determined by a voltage sensor 144. As another example, the control signals can be based on sensed voltage associated with the auxiliary power feed 170 as determined by a voltage sensor 146.

Typically, the control signals provide for control of the operation of the power converter 130. For example, feedback in the form of sensed speed of the DFAG 24 can be used to control the conversion of the output power from the rotor bus 156 to maintain a proper and balanced multi-phase (e.g. three-phase) power supply. Other feedback from other sensors can also be used by the controller 26 to control the power converter 130, including, for example, stator and rotor bus voltages and current feedbacks. Using the various forms of feedback information, switching control signals (e.g. gate timing commands for IGBTs), stator synchronizing control signals, and circuit breaker signals can be generated.

On the stator bus 122 side, sinusoidal multi-phase (e.g. three-phase) alternating current (AC) power is provided from the stator of the generator 120 to the stator bus 122, and from the stator bus 122 to the transformer 160, and in particular to the secondary winding 164 thereof. Various circuit breakers, fuses, contactors, and other devices, such as grid circuit breaker 158, stator bus circuit breaker 156, switch 154, and line bus circuit breaker 152, can be included in the system 100 to connect or disconnect corresponding buses, for example, when current flow is excessive and can damage components of the wind turbine system 100 or for other operational considerations. Additional protection components can also be included in the wind turbine system 100.

Referring still to FIG. 4, a dynamic brake 180 may be provided in the power converter 130 between the rotor-side converter 132 and the line-side converter 134. The dynamic brake 180, when gated on, absorbs energy in the converter 130. For example, in exemplary embodiments as shown, a dynamic brake 180 may include a resistor 182 in series with a switch 184, which may for example be an IGBT.

Referring now to FIGS. 4 and 5, the present disclosure is further directed to methods for operating electrical power systems 100. In some embodiments, the controller 26 is configured to perform such operations. In particular, as shown at 310, the method 300 may include monitoring a current magnitude 312 in the one or more rotor-side converter(s) 132 or one or more line-side converter(s) 134.

Such step 310 may utilize the current magnitude 312 in all rotor-side converters 132 or line-side converters 134 of a power converter 130. In certain embodiments, the current magnitude 312 may correspond to the vector magnitude of the instantaneous current (at a single time) of all phases in the system at the bridge of the one or more rotor-side converter(s) 132 or line-side converter(s) 134. For example, in some embodiments for a single rotor-side converter 132 or line-side converter 134, the current magnitude 312 may be the sum of the instantaneous current in each phase at a bridge squared, such as follows:

$$I_{mag} = I_{a_{inst}}^2 + I_{b_{inst}}^2 + \ldots I_{x_{inst}}^2$$

In other embodiments, the current magnitude 312 may be the square root of the sum of the instantaneous current in each phase at the bridge squared, such as follows:

$$I_{mag} = \text{SQRT}(I_{a_{inst}}^2 + I_{b_{inst}}^2 + \ldots I_{x_{inst}}^2)$$

In other embodiments, the current magnitude 312 may be the square root of two/thirds times the square root of the sum of the instantaneous current in each phase at the bridge squared, such as follows:

$$I_{mag} = \text{SQRT}\left(\frac{2}{3}\right) * \text{SQRT}(I_{a_{inst}}^{+2} + I_{b_{inst}}^2 + \ldots I_{x_{inst}}^2)$$

When the power converter 130 includes a plurality of rotor-side converters 132 or line-side converters 134, the current magnitude corresponds to sum of the current magnitudes in each bridge of each one of the plurality of rotor-side converters 132 or line-side converters 134, such as follows:

$$I_{mag}^2 = [(I_{a1_{inst}}^2 + \ldots I_{an_{inst}}^2)^2 + (I_{ab1_{inst}}^2 + \ldots I_{bn_{inst}}^2)^2 + \ldots (I_{x1_{inst}}^2 + \ldots I_{xn_{inst}}^2)^2] * \frac{2}{3}$$

or $$I_{mag}^2 = [(I_{a1_{inst}}^2 + \ldots I_{an_{inst}}^2)^2 + (I_{ab1_{inst}}^2 + \ldots I_{bn_{inst}}^2)^2 + \ldots (I_{x1_{inst}}^2 + \ldots I_{xn_{inst}}^2)^2]$$

or $$I_{mag_{total}}^2 = (I_{mag_1} + \ldots I_{mag_n})^2$$

or $$I_{mag_{total}} = (I_{mag_1} + \ldots I_{mag_n})$$

It should be understood that other suitable variations of the above equations may be utilized, such as for ease of programming and computation purposes.

Thus, as shown, the method 300 may further include, for example, the step 320 of comparing the current magnitude 312 in the one or more rotor-side converter(s) 132 or line-side converter(s) 134 to a primary predetermined threshold (e.g. 322). In certain embodiments, the primary predetermined threshold 322 may correspond to a predetermined threshold that indicates that a fault event has occurred. Such threshold may be predetermined and thus, for example, programmed into the controller 26.

Referring still to FIG. 5, as shown at 302, the method 300 also includes monitoring a voltage magnitude in the generator 24 of the electrical power system 100. For example, as shown, an alternating current (AC) voltage value (Vac) can be detected from the generator rotor 27.

Thus, as shown at 304, the method 300 may also include comparing the voltage magnitude (e.g. Vmag) in the generator stator 27 to a voltage threshold 306. For example, in an embodiment, the voltage threshold may be set to a voltage level that is lower than voltage levels seen in grid faults. For example, in such embodiments, the voltage threshold may range from about 0.1 pu to about 0.5 pu.

Accordingly, as shown at 330, the method 300 includes disabling bridge switching of the one or more rotor-side converter(s) 132 or line-side converter(s) 134 when both the current magnitude (e.g. Imag) increases above the primary current threshold (e.g. Ithres 322) and the voltage magnitude (e.g. Vmag) decreases below the voltage threshold (e.g. Vthres 306). In particular, in an embodiment, the method 300 may also include disabling bridge switching of the one or more rotor-side converter(s) 132 or line-side converter(s) 134 when the current magnitude increases above the primary current threshold simultaneously with the voltage magnitude decreasing below the voltage threshold. Accordingly, disabling the bridge switching of the one or more rotor-side converter(s) 132 or line-side converter(s) 134 is configured to provide rapid dissipation of excess energy stored in the electrical power system 100.

When bridge switching is disabled for the rotor-side converter(s) 132, no switching of any of the switching elements 192 in any of the one or more rotor-side converter(s) 132 occurs. When bridge switching is disabled for the line-side converter(s) 134, no switching of any of the switching elements 194 in any of the one or more line-side converter(s) 134 occurs. Further, in exemplary embodiments, such switching elements 192 or 194 are disabled in gated-open positions. Accordingly, in these embodiments, when bridge switching is disabled for the rotor-side converter(s) 132, all switching elements 192 in all of the one or more rotor-side converter(s) 132 are disabled in gated-open positions. Similarly, in these embodiments, when bridge switching is disabled for the line-side converter(s) 134, all switching elements 194 in all of the one or more line-side converter(s) 134 are disabled in gated-open positions.

As discussed, the power converter 130 may also include the dynamic brake 180. Accordingly, in some exemplary embodiments, the dynamic brake 180 may be gated on after disabling occurs in accordance with step 330 and while such disabled state is occurring. Further, in some exemplary embodiments and after gating on of the dynamic brake 180, the dynamic brake 180 may be gated off after disabling occurs in accordance with step 330 and either while such disabled state is occurring or after enabling occurs as discussed herein.

Still referring to FIG. 5, the method 300 may further include, for example, the step 340 of comparing the current magnitude 312 in the one or more rotor-side converter(s) 132 or line-side converter(s) 134 to a secondary predetermined threshold 342. Such step 340 occurs after step 330, and is thus based on the current magnitude 312 at a time after such step 330 has occurred. The secondary predetermined threshold 342 may correspond to a predetermined threshold that indicates that a fault event has ended or that the risk of enabling switching in the power converter 130 is appropriately reduced after a fault event has occurred. Such threshold may be predetermined and thus, for example, programmed into the controller 26.

In some exemplary embodiments, the secondary predetermined threshold 342 is different from the primary predetermined threshold. Alternatively, the secondary predetermined threshold 342 is the same as the primary predetermined threshold 322.

Moreover, in another embodiment, the method 300 may further include, for example, the step 350 of enabling bridge switching of the one or more rotor-side converter(s) 132 or line-side converter(s) 134 when the current magnitude 312 falls below and thus is less than the secondary predetermined threshold 342. When bridge switching is enabled for the rotor-side converter(s) 132, switching of the switching elements 192 in the one or more rotor-side converter(s) 132 again occurs, similar to the occurrence of such switching before the occurrence of step 330. When bridge switching is enabled for the line-side converter(s) 134, switching of the switching elements 194 in the one or more line-side converter(s) 134 again occurs, similar to the occurrence of such switching before the occurrence of step 330.

Referring now to FIGS. 6 and 7, the present disclosure is particularly suitable for series-compensated transmission systems. As used herein, series-compensated transmission systems generally refer to systems having improved power-transfer capability by connecting a capacitor in series with the transmission line. In other words, in series compensation, negative impedance is inserted in series with the transmission line for reducing the impedance of the system. For example, as shown in FIG. 6, a simplified, schematic diagram of one embodiment of a series-compensated transmission system 400 is illustrated. At either end, representative Thevenin equivalent circuits of a large interconnected system can be provided, therefore, the illustrated diagram is intended to only represent the two transmission lines 402, 404 leaving a point of interconnection 406 of an inverter-based resource (IBR) 408. In particular, as shown, transmission line 404 is series compensated, meaning that it includes at least one series capacitor 410. It should be understood that the electrical power system 100 described herein may be the inverter-based resource (IBR) 408. Further, the series-compensated transmission system 400 may include multiple electrical power systems, which are also referred to herein as inverter-based resources (IBRs).

Accordingly, FIG. 7 illustrates a flow diagram of one embodiment of a method 500 for operating the series-compensated transmission system 400 illustrated in FIG. 6. In general, the method 500 described herein generally applies to operating the DFAG wind turbine power system 100 described herein. However, it should be appreciated that the disclosed method 500 may be implemented using any other suitable power system that is configured to supply power for application to a load, such as a power grid, such as a solar power system, a hydropower system, an energy storage power system, or combinations thereof. Further, FIG. 7 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

As shown at 502, the method 500 includes monitoring, via the IBR 408, a voltage magnitude and a current magnitude at the IBR 408. As shown at 504, the method 500 includes determining whether the current magnitude or the voltage magnitude exceeds equipment ratings for the IBR 408. If so, as shown at 506, the method 500 includes determining whether a type of high current event occurring is due to energy dissipated from the series capacitor(s) 410 using both the current magnitude and the voltage magnitude. Thus, as shown at 508, the method 500 includes implementing a control action based on the type of high current event. For example, as shown, the type of high current event may include, for example, a grid fault 510 or a fault clearing 512 in the series-compensated transmission system 400.

In particular embodiments, the dissipated energy may be received from the series capacitor 410. In such embodiments, such dissipated energy may be indicative of fault clearing occurring in the system 400. Thus, as shown at 514, the control action may include preventing or avoiding disabling of switching of the one or more rotor-side converter(s) 132 or line-side converter(s) 134 of the inverter-based resource. In another embodiment, as shown at 516, the control action may also include maintaining the current magnitude and the voltage magnitude within equipment ratings of the inverter-based resource 408. In such embodiments, as shown at 518, the control action may further include damping a series resonance from the series-compensated system 400 that causes oscillations in the voltage magnitude and the current magnitude.

In alternative embodiments, the dissipated energy may be received from the power grid, e.g. due to a grid fault. In such embodiments, as shown at 520, the control action may include disabling switching of the one or more rotor-side converter(s) 132 or line-side converter(s) 134 when the current magnitude increases above the primary current threshold and the voltage magnitude decreases below the voltage threshold.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for operating an inverter-based resource, the inverter-based resource comprising a power converter with a plurality of switching elements, the method comprising:

monitoring a current magnitude in the inverter-based resource;

monitoring a voltage magnitude in the inverter-based resource;

comparing the current magnitude in the inverter-based resource to a primary current threshold;

comparing the voltage magnitude in the inverter-based resource to a voltage threshold; and, disabling switching of the switching elements of the power converter when the current magnitude increases above the primary current threshold and the voltage magnitude decreases below the voltage threshold to bypass the switching elements of the power converter until excess energy in the inverter-based resource is dissipated.

Clause 2. The method of clause 1, further comprising disabling switching of the switching elements of the power converter when the current magnitude increases above the primary current threshold simultaneously with the voltage magnitude decreasing below the voltage threshold.

Clause 3. The method of any of the preceding claims, wherein the inverter-based resource comprises a dual-fed asynchronous generator (DFAG).

Clause 4. The method of clause 3, wherein the DFAG comprises a generator rotor and a generator stator, the method further comprising detecting the voltage magnitude in the generator stator.

Clause 5. The method of any of the preceding claims, wherein the voltage threshold is set to a voltage level that is observed for close-in grid faults, the voltage threshold ranging from about 0.1 pu to about 0.5 pu.

Clause 6. The method of any of the preceding claims, wherein, by requiring both the current magnitude to increase above the primary current threshold and the voltage magnitude to decrease below the voltage threshold before disabling switching, the method distinguishes between high currents caused by a discharge of energy stored within the inverter-based resource and high currents caused by energy discharge from sources external to the inverter-based resource.

Clause 7. The method of any of the preceding claims, further comprising:
comparing, after disabling occurs, the current magnitude in the power converter to a secondary current threshold; and
enabling switching of the switching elements of the power converter when the current magnitude is less than the secondary current threshold.

Clause 8. The method of clause 7, wherein the secondary current threshold is different from the primary current threshold.

Clause 9. The method of any of the preceding claims, wherein the power converter further comprises a DC link and a dynamic brake, and wherein the dynamic brake is gated on after disabling occurs.

Clause 10. The method of any of the preceding claims, wherein the inverter-based resource comprises at least one of a full conversion wind turbine power system, a solar power system, or an energy storage system.

Clause 11. A method for operating an inverter-based resource connected to a series-compensated transmission system, the series-compensated transmission system having at least one series capacitor, the method comprising:
monitoring, via the inverter-based resource, a voltage magnitude and a current magnitude at the inverter-based resource;
when at least one of the current magnitude or the voltage magnitude exceed equipment ratings, determining whether a type of high current event occurring is due to energy dissipated from the at least one series capacitor using both the current magnitude and the voltage magnitude; and,
implementing a control action based on the type of high current event.

Clause 12. The method of clause 11, wherein the type of high current event comprises at least one of a grid fault or a fault clearing in the series-compensated transmission system.

Clause 13. The method of clauses 11-12, wherein the dissipated energy is received from the series capacitor.

Clause 14. The method of clause 13, wherein, when the dissipated energy is received from the series capacitor, implementing the control action based on the type of high current event occurring in the inverter-based resource further comprises:
preventing, via the inverter-based resource, disabling of switching of a power converter of the inverter-based resource.

Clause 15. The method of clause 13, wherein, when the dissipated energy is received from the series capacitor, implementing the control action based on the type of high current event occurring in the inverter-based resource further comprises:
maintaining, via the inverter-based resource, the current magnitude and the voltage magnitude within equipment ratings of the inverter-based resource.

Clause 16. The method of clause 13, wherein, when the dissipated energy is received from the series capacitor, implementing the control action based on the type of high current event occurring in the inverter-based resource further comprises:
damping a series resonance from the series-compensated system that causes oscillations in the voltage magnitude and the current magnitude.

Clause 17. The method of clauses 11-16, wherein the dissipated energy is received from the power grid.

Clause 18. The method of clause 17, wherein, when the dissipated energy is received from the power grid, implementing the control action based on the type of high current event occurring in the inverter-based resource further comprises:
disabling switching of the power converter when the current magnitude increases above the primary current threshold and the voltage magnitude decreases below the voltage threshold.

Clause 19. A wind power system connected to a series-compensated transmission system, the series-compensated transmission system having at least one series capacitor, the wind power system comprising:
a dual-fed asynchronous generator comprising a generator rotor and a generator stator;
a power converter coupled to the generator rotor, the power converter comprising a rotor-side converter and a line-side converter, the rotor-side converter or the line-side converter comprising a plurality of switching elements defining a bridge;
a controller communicatively coupled to the power converter, the controller configured to perform a plurality of operations, the plurality of operations comprising:
receiving voltage and current feedbacks from the wind turbine power system;
determining a voltage magnitude and a current magnitude at the wind power system based on the voltage and current feedbacks;
when at least one of the current magnitude or the voltage magnitude exceed equipment ratings, determining a type of high current event occurring using both the current magnitude and the voltage magnitude; and,
selecting between disabling or enabling bridge switching of the rotor-side converter or the line-side converter based on the type of high current event.

Clause 20. The wind power system of clause 19, wherein the type of high current event comprises at least one of a grid fault in the power grid or a fault clearing in the wind power system.

What is claimed is:

1. A method for operating an inverter-based resource, the inverter-based resource comprising a power converter with a plurality of switching elements, the method comprising:
monitoring a current magnitude in the inverter-based resource;
monitoring a voltage magnitude in the inverter-based resource;
comparing the current magnitude in the inverter-based resource to a primary current threshold;
comparing the voltage magnitude in the inverter-based resource to a voltage threshold; and,
disabling switching of the switching elements of the power converter when the current magnitude increases above the primary current threshold and the voltage magnitude decreases below the voltage threshold to bypass the switching elements of the power converter until excess energy in the inverter-based resource is dissipated, wherein, by requiring both the current magnitude to increase above the primary current threshold and the voltage magnitude to decrease below the voltage threshold before disabling switching, the method distinguishes between high currents caused by a discharge of energy stored within the inverter-based resource and high currents caused by energy discharge from sources external to the inverter-based resource.

2. The method of claim 1, further comprising disabling switching of the switching elements of the power converter when the current magnitude increases above the primary current threshold simultaneously with the voltage magnitude decreasing below the voltage threshold.

3. The method of claim 1, wherein the inverter-based resource comprises a dual-fed asynchronous generator (DFAG).

4. The method of claim 3, wherein the DFAG comprises a generator rotor and a generator stator, the method further comprising detecting the voltage magnitude in the generator stator.

5. The method of claim 1, wherein the voltage threshold is set to a voltage level that is observed for close-in grid faults, the voltage threshold ranging from about 0.1 pu to about 0.5 pu.

6. The method of claim 1, further comprising:
comparing, after disabling occurs, the current magnitude in the power converter to a secondary current threshold; and
enabling switching of the switching elements of the power converter when the current magnitude is less than the secondary current threshold.

7. The method of claim 6, wherein the secondary current threshold is different from the primary current threshold.

8. The method of claim 1, wherein the power converter further comprises a DC link and a dynamic brake, and wherein the dynamic brake is gated on after disabling occurs.

9. The method of claim 1, wherein the inverter-based resource comprises at least one of a full conversion wind turbine power system, a solar power system, or an energy storage system.

10. A method for operating an inverter-based resource connected to a series-compensated transmission system, the series-compensated transmission system having at least one series capacitor, the method comprising:
monitoring, via the inverter-based resource, a voltage magnitude and a current magnitude at the inverter-based resource;
when at least one of the current magnitude or the voltage magnitude exceed equipment ratings, determining whether a type of high current event occurring is due to energy dissipated from the at least one series capacitor using both the current magnitude and the voltage magnitude to distinguish between high currents caused by a discharge of energy stored within the wind power system and high currents caused by energy discharge from sources external to the wind power system; and,
implementing a control action based on the type of high current event.

11. The method of claim 10, wherein the type of high current event comprises at least one of a grid fault or a fault clearing in the series-compensated transmission system.

12. The method of claim 10, wherein the dissipated energy is received from the series capacitor.

13. The method of claim 12, wherein, when the dissipated energy is received from the series capacitor, implementing the control action based on the type of high current event occurring in the inverter-based resource further comprises:
preventing, via the inverter-based resource, disabling of switching of a power converter of the inverter-based resource.

14. The method of claim 12, wherein, when the dissipated energy is received from the series capacitor, implementing the control action based on the type of high current event occurring in the inverter-based resource further comprises:
maintaining, via the inverter-based resource, the current magnitude and the voltage magnitude within equipment ratings of the inverter-based resource.

15. The method of claim 12, wherein, when the dissipated energy is received from the series capacitor, implementing the control action based on the type of high current event occurring in the inverter-based resource further comprises:
damping a series resonance from the series-compensated system that causes oscillations in the voltage magnitude and the current magnitude.

16. The method of claim 10, wherein the dissipated energy is received from the power grid.

17. The method of claim 16, wherein, when the dissipated energy is received from the power grid, implementing the control action based on the type of high current event occurring in the inverter-based resource further comprises:
disabling switching of the power converter when the current magnitude increases above the primary current threshold and the voltage magnitude decreases below the voltage threshold.

18. A wind power system connected to a series-compensated transmission system, the series-compensated transmission system having at least one series capacitor, the wind power system comprising:
a dual-fed asynchronous generator comprising a generator rotor and a generator stator;
a power converter coupled to the generator rotor, the power converter comprising a rotor-side converter and a line-side converter, the rotor-side converter or the line-side converter comprising a plurality of switching elements defining a bridge;
a controller communicatively coupled to the power converter, the controller configured to perform a plurality of operations, the plurality of operations comprising:
receiving voltage and current feedbacks from the wind turbine power system;
determining a voltage magnitude and a current magnitude at the wind power system based on the voltage and current feedbacks;
when at least one of the current magnitude or the voltage magnitude exceed equipment ratings, determining a type of high current event occurring using both the current magnitude and the voltage magnitude to distinguish between high currents caused by a discharge of energy stored within the wind power system and high currents caused by energy discharge from sources external to the wind power system; and,
selecting between disabling or enabling bridge switching of the rotor-side converter or the line-side converter based on the type of high current event.

19. The wind power system of claim 18, wherein the type of high current event comprises at least one of a grid fault in the power grid or a fault clearing in the wind power system.

* * * * *